Patented Nov. 10, 1942

2,301,663

UNITED STATES PATENT OFFICE 2,301,663

PROCESS OF PREPARING METALS AND ALLOYS

Eduard Zintl, Darmstadt, and Wilhelm Joseph Morawietz, Bitterfeld, Germany; vested in the Alien Property Custodian No Drawing. Application December 3, 1940, Serial No. 368,336. In Germany April 22, 1939

8 Claims. (Cl. 75—84)

The present invention relates to a process of preparing metals and alloys.

If oxides of difficultly volatile metals are reduced under known conditions with the aid of silicon or alloys rich in silicon, for instance ferrosilicon, by heating the mixture under reduced pressure at temperatures between about 1280° C. and about 1350° C. there is obtained a mixture of difficultly volatile metal and silicate which in many cases can be separated in the reaction chamber only with great difficulties.

Now, we have found a novel process for the preparation of metals and alloys which, like the known processes, is based on the reduction of difficultly volatile oxides of metals with the aid of silicon but which allows of obtaining in one single operation the metals in a technically pure state and of removing at the same time the silicon from the reaction mixture, thus avoiding the formation of silicate residue in the reaction chamber.

The process of the present invention is based on the reduction of difficultly volatile metal oxides with the aid of silicon at temperatures between 1100 and 2500° C. with volatilization of silicon monoxide. In order to obtain a metal free from oxygen and silicon the quantity of silicon in the reaction mixture must be such that for 1 atom of oxygen 1 atom of silicon is present. If the mixing proportion is as just stated and the metal obtained by reduction has a sufficiently high boiling point only the silicon monoxide volatilizes and the metal remains in a pulverized, sintered or molten state. For instance, tantalum metal is obtained according to the following equation:

$$Ta_2O_5 + 5Si = 2Ta + 5SiO$$

According to another object of the invention it is also possible to obtain metals which are not difficultly volatile in case the metal may be separated from the silicon oxide by fractional condensation of the vapors.

Instead of silicon there may be used with the same success for the reduction of the oxide a silicide or a silicon alloy of the metal to be prepared.

It has already been proposed to prepare metals or alloys poor in carbon by silico-thermic reduction of metal oxides by using as reducing agent a silicon alloy in the fused state. But also in this case, as in the known process mentioned above, the formation of a silicate residue in the reaction chamber besides the metal reduced and the resultant disadvantages already described are unavoidable.

Contrary thereto, according to the process of the present invention, no silicate residue is formed even if silicon alloys are used as reducing agent but the silicon is volatilized as SiO. The reaction of tantalum oxide and tantalum silicide, for instance, takes place according to the following equation:

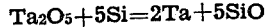

$$5TaSi_2 + 2Ta_2O_5 = 9Ta + 10SiO$$

Very pure metals are obtained according to the present process if the reaction is carried out in a vessel made of the metal to be prepared.

The process according to the invention may also be applied with advantage for the direct preparation of alloys. In this case there are heated, instead of one single metal oxide, mixtures or compounds of several metal oxides or mixtures of metal oxides or metal oxide compounds with metals with corresponding quantities of silicon or silicides. By application of silicon in excess of the above mentioned proportion oxygen/silicon alloys containing silicon may thus also be obtained.

Since the formation of alloys reduces the vapor pressure of volatile metals, the losses caused by volatilization are smaller when alloys are formed than when easily volatile metals are prepared in the pure state.

The present process is especially suitable for the preparation of metals or alloys of the scandium and lanthanum group, the titanium group, the vanadium group, and the chromium group.

Hitherto the preparation of larger quantities of these elements in the pure state encountered great difficulties. According to the processes hitherto known, for instance, by electrolysis or reduction of oxides or halides by means of hydrogen, carbon or non-noble metals, there are only obtained metals which are more or less contaminated by oxygen, nitrogen or residues of the reducing agents. By thermic decomposition of compounds pure metals may be obtained, but this process is limited to a preparation on a laboratory scale.

The following examples illustrate the invention, the parts being by weight:

(1) 7.56 parts by weight of pure tantalum pentoxide and 2.79 parts by weight of silicon are intimately mixed and heated for 5 hours in a crucible of tantalum under an absolute pressure of about $10^{-4}$ mm. of mercury. Oxygen and silicon are entirely volatilized in the form of silicon monoxide and there remains a light-gray metal powder containing 99% of tantalum.

(2) 2.07 parts by weight of finely powdered silicon and 4.00 parts by weight of pure niobium dioxide, $NbO_2$, are intimately mixed, pressed to form pieces and heated for ½ hour at about 1800° C. under an absolute pressure of $10^{-5}$ mm. of mercury. Thereby the silicon and the oxygen of the oxide volatilize as silicon monoxide and the entire niobium remains as a pure, compact and ductile metal.

It is obvious that our invention is not limited to the foregoing examples or to the specific details given therein. Thus, for instance, as mentioned above, other difficultly volatile metal oxides may be reduced in practically the same manner; the temperatures and the oxygen pressure may be varied in certain limits and the best way for producing certain metals from their oxides is easily determinable by the simple experiment, the crux of our invention being the development of SiO for carrying away the oxygen content of the metal oxides under treatment.

What we claim is:

1. The process for producing metals forming difficultly volatile oxides in the range of the reducing temperature from their oxides by reduction with a silicon containing reducing agent by heating them in the ratio corresponding to the general formula $Me_xO_y + ySi = xMe + ySiO$, wherein Me means a metal and $x$ and $y$ are a whole number, under reduced pressure to a temperature at which SiO is volatilized.

2. The process for producing metals forming difficultly volatile oxides in the range of the reducing temperature from their oxides by reduction with a silicon alloy by heating them in the ratio corresponding to the general formula $Me_xO_y + ySi = xMe + ySiO$, wherein Me means a metal and $x$ and $y$ are a whole number, under reduced pressure to a temperature at which SiO is volatilized.

3. The process for producing metals forming difficultly volatile oxides in the range of the reducing temperature from their oxides by reduction with ferrosilicium by heating them in the ratio corresponding to the general formula $Me_xO_y + ySi = xMe + ySiO$, wherein Me means a metal and $x$ and $y$ are a whole number, under reduced pressure to a temperature at which SiO is volatilized.

4. The process for producing metals forming difficultly volatile oxides in the range of the reducing temperature from their oxides by reduction with silicon by heating them in the ratio corresponding to the general formula $$Me_xO_y + ySi = xMe + ySiO$$

wherein Me means a metal and $x$ and $y$ are a whole number, under reduced pressure to a temperature at which SiO is volatilized.

5. The process for producing metals forming difficultly volatile oxides in the range of the reducing temperature from their oxides by reduction with a silicon containing reducing agent by heating them in the ratio corresponding to the general formula $Me_xO_y + ySi = xMe + ySiO$, wherein Me means a metal and $x$ and $y$ are a whole number, under reduced pressure to a temperature between 1100° C. and 2500° C.

6. The process for producing metals forming difficultly volatile oxides in the range of the reducing temperature from their oxides by reduction with a silicon containing reducing agent by heating them in the ratio corresponding to the general formula $Me_xO_y + ySi = xMe + ySiO$, wherein Me means a metal and $x$ and $y$ are a whole number, under a pressure of below $10^{-3}$ mm. of mercury to a temperature between 1100° C. and 2500° C.

7. The process for the preparation of tantalum which comprises heating tantalum pentoxide with silicon in the ratio $Ta_2O_5:Si = 1:5$ to reaction temparature under a pressure of $10^{-4}$ mm. of mercury so that SiO is volatilized.

8. The process for the preparation of niobium which comprises heating niobium dioxide with silicon in the ratio $NbO_2:Si = 1:2$ to reaction temperature under a pressure of $10^{-5}$ mm. of mercury so that SiO is volatilized.

EDUARD ZINTL.
WILHELM JOSEPH MORAWIETZ.